United States Patent Office 2,743,212
Patented Apr. 24, 1956

2,743,212

PROCESS FOR CONVERTING CARBONYLATION PRODUCT TO MIXTURE OF ALCOHOLS AND ACIDS

Bernard F. Crowe, Beacon, N. Y., assignor to The Texas Company, New York, N. Y., a corporation of Delaware No Drawing. Application June 12, 1952,
Serial No. 293,217

7 Claims. (Cl. 195—28)

This invention relates to a process for treating the reaction product of olefins with carbon monoxide and hydrogen in so-called "Oxo" or carbonylation reaction. More specifically, the process of this invention provides means for converting the predominantly aldehydic carbonylation product to a mixture comprising mainly alcohols and acids by dismutation with microorganisms.

The reaction product obtained in the carbonylation reaction usually comprises 40 to 70 per cent aldehydes, 35 to 40 per cent alcohols and 5 to 20 per cent high boiling fraction comprising mainly acetals formed by reaction of aldehydes with alcohols and aldols formed by condensation of aldehyde monomers. Hereafter carbonylation product is used to designate this predominantly aldehydic product of reaction between an olefin, carbon monoxide and hydrogen at moderate temperature and elevated pressure in the presence of a cobalt catalyst. Since there is not at present any substantial commercial utilization of $C_3$ and higher aldehydes, they are usually converted to alcohols or to acids for both of which there is a large commercial demand. The carbonylation product is converted to alcohols by hydrogenation; in order to convert it to acids, alcohols are usually separated by fractionation and the alcohol-free aldehydes are oxidized. While the hydrogenation reaction proceeds rather smoothly in the presence of conventional hydrogenation catalysts such as Raney nickel and copper chromite, oxidation of the alcohol-free carbonylation product has been troublesome. Apparently conditions which are optimum for oxidation are also favorable for condensing aldehydes to high molecular weight materials which do not readily lend themselves to oxidation. This invention provides a simple process for converting carbonylation product without further treatment into a mixture comprising mainly alcohol and acids which are readily separated from one another by fractional distillation.

In accordance with the process of this invention, a carbonylation product is contacted with Acetobacter microorganisms in aqueous medium with the result that the aldehyde content thereof is dismutated to a mixture of alcohols and acids. As a result of subjecting carbonylation product to the action of the Acetobacter microorganisms in aqueous medium, the treated carbonylation product comprises readily separable alcohols and acids. A remarkable feature of the process of this invention is that the aldols and acetals, which comprise the high molecular weight fraction of the carbonylation product, are decomposed by the action of the Acetobacter microorganisms into their aldehyde building blocks which are converted to alcohols and acids. Aerobic or anaerobic conditions can be employed for contacting the carbonylation product with Acetobacter microorganisms, but anaerobic conditions are normally employed.

Contact between carbonylation product and the Acetobacter microorganisms in aqueous medium is normally effected with agitation because the carbonylation product, particularly when olefins higher than $C_4$ are carbonylated, is substantially water insoluble. Temperatures between 50 and 125° F., and a pH range of 5 to 9, are prescribed for contact of the carbonylation product with the Acetobacter microorganisms.

The reaction of olefins with carbon monoxide and hydrogen in the carbonylation reaction is effected at temperatures between 100 and 300° F. and at pressures between 200 and 5,000 lbs. per square inch with a cobalt catalyst. It has been well established that cobalt carbonyl is the active catalyst and it can be either formed in situ by the reaction of metallic cobalt with the carbon monoxide reactant or can be introduced into the carbonylation reaction in solution in the olefin or in an inert solvent such as benzene. The composition of a typical carbonylation product is illustrated by the reaction of diisobutylene with carbon monoxide and hydrogen at a temperature of about 250° F., and a pressure of 2,500 lbs. per square inch to yield a product comprising 60 per cent $C_9$ aldehyde, 30 per cent $C_9$ alcohol, and 10 per cent higher boiling product.

Dismutation of the aldehydes present in carbonylation product is effected by contacting the product at a temperature between 50 and 125° F. with approximately an equal volume of an aqueous solution containing Acetobacter bacteria and a nutrient mixture effective for the growth and metabolism of the bacteria. Although normally an equal volume of Acetobacter-containing aqueous solution is contacted with carbonylation product, the amount of aqueous medium used can vary from one-third to twice the volume of the carbonylation product. Temperatures between 70 and 110° F. are preferred for contact of carbonylation product with the Acetobacter-containing aqueous mixture.

Since the reaction product obtained by carbonylation of olefins higher than $C_4$ olefins is sbstantially insoluble in water, the mixture of carbonylation product and Acetobacter-containing aqueous solution is subjected to agitation in order to provide better contact between the Acetobacter and the aldehydes. Conventional means of agitation such as mixers, shakers, etc., can be employed to obtain the desired agitation.

*Acetobacter ascendens* and *Acetobacter xylinum* are preferred for converting carbonylation product into a mixture comprising predominantly alcohols and acids. The following species of Acetobacter bacteria can also be employed in the process of this invention: *Aceti, melanogenum, pasteurianum, rancens,* and *suboxydans.* All of the Acetobacter species effect rapid dismutation of the aldehydes present in the carbonylation product into aldehydes and acids without effecting degradation of the aldehydes to compounds of shorter carbon skeletal structure through loss of carbon dioxide. The dismutation effected by the Acetobacter bacteria is perfectly adapted to the treatment of carbonylation product because it converts the mixture into alcohols and acids for which there is commercial demand without the loss of the carbon which is added to the olefin in the carbonylation reaction. It is particularly noteworthy that the reaction product obtained by contact of carbonylation product with the Acetobacter bacteria is substantially free from high boiling compounds and comprises mainly alcohols and acids containing one more carbon atom than the olefin subjected to carbonylation.

After contact of carbonylation product with Acetobacter which requires about 4 to 8 hours when the contact is effected with good agitation, the treated carbonylation product is separated from the Acetobacter-containing aqueous solution. When the treated product results from the carbonylation of lower olefins such as ethylene and propylene, it is advisable to subject the aqueous mixture to extraction after separation of the insoluble upper layer. With the carbonylation product of higher olefins, the alcohols and acids produced in the process of the invention are sufficiently water-insoluble to recover the product by physical separation.

As pointed out previously, the Acetobacter-containing aqueous solution is fortified with inorganic salts which are required for the proper growth and metabolism of the microorganisms. A typical nutrient medium for the Acetobacter bacteria comprises the following materials per 1,000 cc. of solution:

| | Gram |
|---|---|
| $(NH_4)_2SO_4$ | 3 |
| $KH_2PO_4$ | 3 |
| $MgSO_4$ | 2 |
| Yeast | 10 |

The above nutrient medium is merely illustrative of the type of nutrient solutions that can be employed in connection with the conversion of carbonylation product to alcohols and acids by Acetobacter Nutrient media adapted for proper development of the Acetobacter bacteria are well known and are found in reference books on the action of microorganisms.

The process of the invention is illustrated in the following examples wherein the products obtained by carbonylation of several olefins are subjected to treatment of the Acetobacter bacteria with the resulting production of a mixture comprising mainly alcohols and acids.

Example I 100 cc. (83 g.) of a mixture comprising 60 per cent $C_9$ aldehyde, 30 per cent $C_9$ alcohol and 10 per cent higher boiling fraction, and obtained by reaction of octylene-1, carbon monoxide, and hydrogen at a temperature of about 250° F. and at 2,500 lbs. per square inch in the presence of cobalt carbonyl, is mixed with an equal volume of an aqueous solution containing the nutrient mixture outlined above. This mixture is inoculated with *Acetobacter ascendens* and is stirred for a period of about 6 hours under anaerobic conditions. At the end of this time the mixture is allowed to settle and the upper layer is separated therefrom. Fractional distillation of the upper layer yields 51 g. of a fraction distilling between 195° and 215° C. at atmospheric pressure and 30 g. of a fraction distilling between 244° and 254° C. The lower boiling fraction is the $C_9$ alcohol fraction while the higher boiling point fraction is the $C_9$ acid fraction. Substantially no high boiling residue remains indicating that contact of the carbonylation product with *Acetobacter ascendens* effects breakdown of the high boiling fractions into $C_9$ aldehyde which is then dismutated by the microorganisms.

Example II 100 cc. (83 g.) of the octylene-1 carbonylation product having the composition set forth in Example I is mixed with an equal volume of an aqueous solution containing a nutrient mixture outlined above. This mixture is inoculated with *Acetobacter suboxydans* and is stirred for a period of about six hours under aerobic conditions. At the end of this time, the mixture is allowed to settle and the upper layer is separated therefrom. Fractional distillation of the upper layer yields 49 g. of a fraction distilling between 195 and 215° C. at atmospheric pressure and 29 g. of a fraction distilling between 244 and 254° C.

The foregoing examples illustrate how a carbonylation product is converted into a mixture of alcohols and acids by contact with Acetobacter microorganisms in an aqueous medium. It will be understood that other Acetobacter than those specified in the examples and other reaction conditions within the limits heretofore specified, can be employed for the anaerobic dismutation of the carbonylation product.

It is also possible to separate the alcohol fraction from the carbonylation product prior to conversion of the aldehydes with Acetobacter to a mixture of alcohols and acids. However, since the alcohol content is substantially unaffected by the action of Acetobacter which is specific to the dismutation of the aldehydes, it is customary to contact the entire carbonylation product with the Acetobacter under the prescribed conditions. As a matter of fact, the specificity of the Acetobacter microorganisms in dismutating the aldehydes and higher boiling fractions of carbonylation product without attacking the alcohols is one of the outstanding features of this invention.

Obviously many modifications and variations of the invention, as hereinbefore set forth, may be made without departing from the spirit and scope thereof, and therefore only such limitations should be imposed as are indicated in the appended claims.

I claim:

1. A process for converting carbonylation product obtained by reaction of olefins with carbon monoxide and hydrogen into a mixture of alcohols and acids which comprises subjecting said product comprising aldehydes, alcohols and a high boiling fraction consisting mainly of acetals and aldols to contact with Acetobacter microorganisms and effecting said contact in an aqueous nutrient medium at a temperature between 50 and 125° F. with the resulting conversion of said aldehyde and high boiling components to alcohols and acids of the same chain length as the aldehydes and alcohols originally present in said carbonylation product while said alcohol component is substantially unaffected.

2. A process according to claim 1 which is effected under aerobic conditions.

3. A process according to claim 1 which is effected under anaerobic conditions.

4. A process according to claim 1 in which contact of the carbonylation product with Acetobacter microorganisms is effected within a pH range of 5 to 9.

5. A process according to claim 1 in which *Acetobacter xylinum* is employed.

6. A process according to claim 1 in which *Acetobacter ascendens* is employed.

7. A process according to claim 1 in which *Acetobacter suboxydans* is employed.

References Cited in the file of this patent

UNITED STATES PATENTS 1,908,225　　Currie　　May 9, 1933

OTHER REFERENCES

Ser. No. 367,301, Grandel (A. P. C.), published May 18, 1943.

Porter: Bacterial Chemistry and Physiology, Wiley, 1946, pages 973, 986.